(12) United States Patent
Watson

(10) Patent No.: US 8,635,777 B2
(45) Date of Patent: Jan. 28, 2014

(54) FUEL TANK FUEL SYSTEM

(76) Inventor: Kenneth A. Watson, Vancouver, WA (US)

( * ) Notice: Subject to any disclaimer, the term of this patent is extended or adjusted under 35 U.S.C. 154(b) by 50 days.

(21) Appl. No.: 13/374,711

(22) Filed: Jan. 9, 2012

(65) Prior Publication Data

US 2012/0110852 A1 May 10, 2012

Related U.S. Application Data

(62) Division of application No. 12/381,083, filed on Mar. 6, 2009, now Pat. No. 8,091,722.

(60) Provisional application No. 61/068,647, filed on Mar. 7, 2008.

(51) Int. Cl.
*B21D 53/88* (2006.01)
*F17D 1/08* (2006.01)

(52) U.S. Cl.
USPC .......................... 29/897.2; 220/86.2

(58) Field of Classification Search
USPC ........ 29/897.2, 428, 455.1, 469, 801, 525.13; 220/86.2, 86.1, 661, 562; 137/590, 137/592, 15.08, 351; 215/391, 390
See application file for complete search history.

(56) References Cited

U.S. PATENT DOCUMENTS 5,601,066 A * 2/1997 Qutub .......................... 123/541

* cited by examiner

*Primary Examiner* — John C Hong
(74) *Attorney, Agent, or Firm* — Ingrid McTaggart

(57) ABSTRACT

The present invention provides a fuel draw and return system including a plate, a first fuel tube secured to the plate, and a second fuel tube secured to the plate, wherein the first and second fuel tubes are secured to one another and to the plate to define a triangular shaped connection configuration.

16 Claims, 2 Drawing Sheets

FUEL TANK FUEL SYSTEM

This application is a divisional of U.S. patent application Ser. No. 12/381,083, filed Mar. 6, 2009 which issued as a patent on Jan. 10, 2012, as U.S. Pat. No. 8,091,722, and which claims priority on U.S. provisional patent application Ser. No. 61/068,647, filed on Mar. 7, 2008, entitled Fuel Tank Vertical Adapter, in the name of the same inventor.

BACKGROUND OF THE INVENTION

Fuel tanks may be utilized on commercial vehicles. An adapter plate may be utilized to secure a supply tube and a return tube in an interior of the fuel tank. Typical driving conditions may cause vibration and jostling of the fuel tank. This may lead to loosening or damage of the supply and return tubes positioned in the interior of the fuel tank. Accordingly, it may be desirable to provide a configuration that reduces loosening or damage of the supply and return tubes within the fuel tank.

SUMMARY OF THE INVENTION

The present invention provides a fuel tank adapter plate including a supply tube and a return tube secured thereto. The supply and return tubes are secured to the adapter plate vertically with respect to one another and at the tube end regions so as to define an triangular shape which provides a resilient and strong structure. This resilient and strong structure may withstand the harsh conditions of commercial vehicle driving.

DETAILED DESCRIPTION OF THE DRAWINGS

Figures 1, 2, 3, 4:
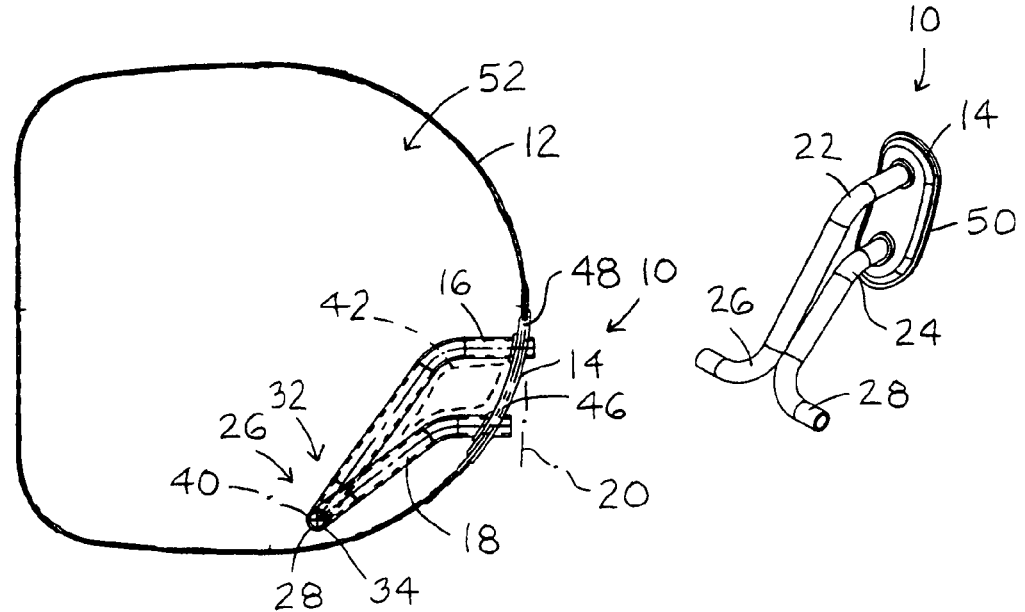
FIG. 1 is a top view showing one embodiment of the fuel tank adapter in an installed condition on a fuel tank.
FIG. 2 is a back view of the fuel tank adapter of FIG. 1.
FIG. 3 is a side view of the fuel tank adapter of FIG. 1.
FIG. 4 is an isometric view of the fuel tank adapter of FIG. 1.
Figure 5:
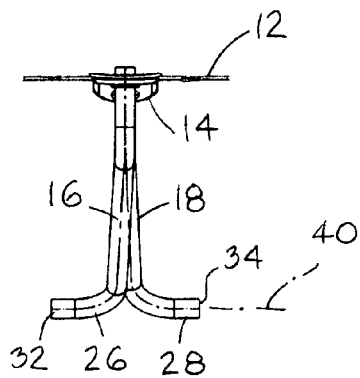
FIG. 5 is a top view showing another embodiment of the fuel tank adapter in an installed condition on a fuel tank.
Figure 6:
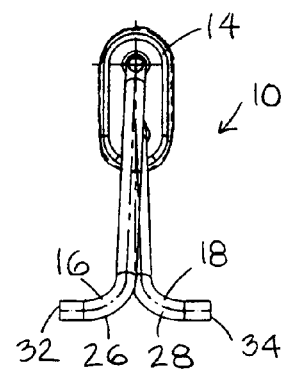
FIG. 6 is a back view of the fuel tank adapter of FIG. 5.
Figure 7:
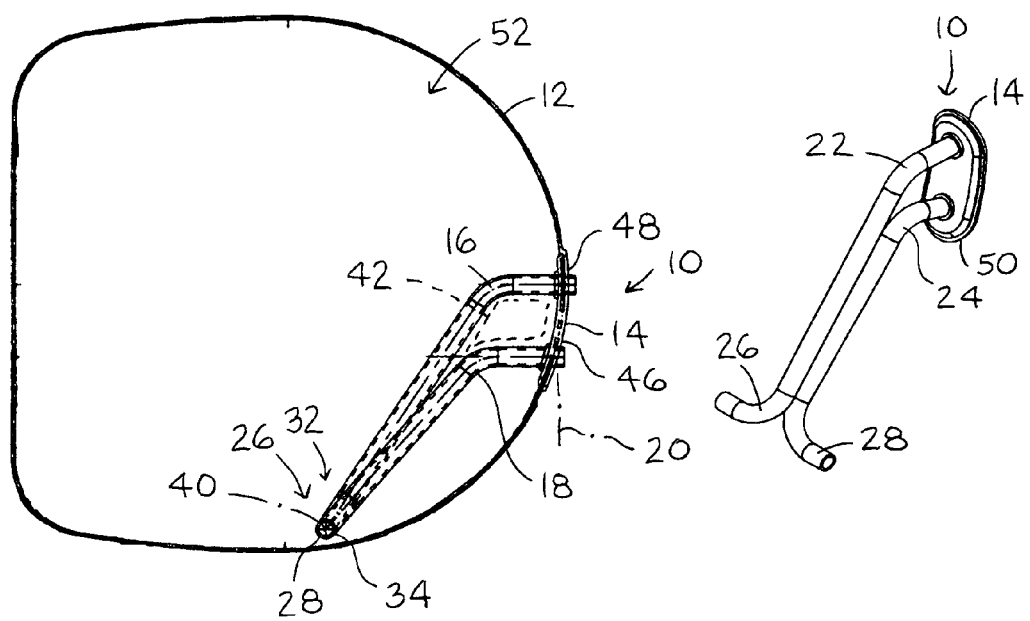
FIG. 7 is a side view of the fuel tank adapter of FIG. 5.
Figure 8:
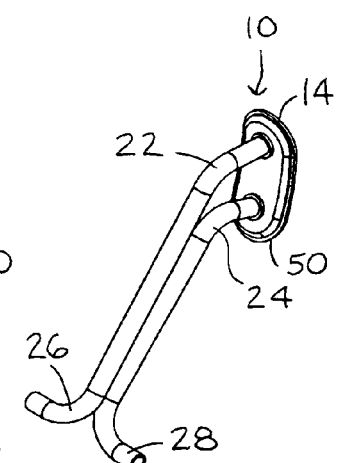
FIG. 8 is an isometric view of the fuel tank adapter of FIG. 5.

FIGS. 1-4 are views showing one example embodiment of a fuel tank tube fuel system 10 in an installed condition on a fuel tank 12. System 10 includes a plate 14 and a first tube 16 and a second tube 18 secured thereto. First tube 16 is secured on plate 14 vertically above the position where second tube 18 is secured to adapter plate 14 such that the two tubes 16 and 18 are secured on plate 14 along a single elongate vertical axis 20 (shown in end view in FIG. 1 and side view in FIG. 3), when the system 10 is installed on tank 12. In other words, first tube 16 is secured to plate 14 at a position approximately vertically above a position wherein second tube 18 is secured to plate 14. A first end region 22 and 24, respectively, of first and second tubes 16 and 18 are secured to plate 12. A second end region 26 and 28, respectively, of first and second tubes 16 and 18, are secured together, such as secured directly together by a weld 30 in a lower bend region of tubes 16 and 18. Tube 16 may include a slight bend region 16a (shown in FIG. 1) such that second end regions 26 and 28 of tubes 16 and 18, respectively, are positioned side by side to one another (see FIG. 1) so that the end regions 26 and 28 are both positioned along a horizontal axis 40.

Second end regions 26 and 28, respectively, each define a tube opening 32 and 34, respectively, that are positioned opposed to one another such that opening 32 opens in a first direction 36 and opening 34 opens in a second direction 38 opposite to first direction 36. Additionally, first and second end regions 26 and 28 are both positioned along elongate horizontal axis 40 when the system 10 is installed on fuel tank 12, wherein horizontal axis 40 is perpendicular to vertical axis 20.

The first and second tubes 16 and 18, and plate 12, are all secured together to define a rigid triangular or "A" shaped connection configuration 42 (best viewed in FIG. 3). In other words, plate 14, first tube 16, and second tube 18 define a generally triangular space therebetween 42. Accordingly, plate 14 defines a first side of the triangular shaped space 42, first tube 16 defines a second side of triangular shaped space 42, and second tube 18 defines a third side of triangular shaped space 42.

This triangular space, or triangular connection configuration 42, allows system 10 to provide increased strength and stability to the fuel tube system 10 over prior art fuel tank tube designs. In particular, the A-frame type shape 42 of the connection between the three components of plate 14, first tube 16, and second tube 18, provides a sturdy and rigid connection that may provide increased stability to fuel system 10 during rugged in-use conditions encountered during commercial truck driving conditions, such as frequent or continued vibrations, jarring motions caused by potholes or bumps in the road, and fuel tank expansion or contraction caused by extreme weather conditions.

The vertical arrangement of first end regions 22 and 24 of tubes 16 and 18, respectively, secured on plate 14 along vertical axis 20 provides several advantages, in addition to the structural strength advantages discussed above. For example, the vertical arrangement of first end regions 22 and 24 of tubes 16 and 18 allows plate 14 to be manufactured of a relatively small sided width 44, thereby reducing material costs of the plate 14. An opening 46 in tank 12 may be formed in a vertically elongate shape to match the shape of plate 14, wherein opening 46 may define a perimeter 48 that is smaller than a perimeter 50 (see FIG. 4) of plate 14 such that the plate is secured over opening 46. Opening 46 may be formed in a lower half region of a side wall of tank 12.

Such a vertically elongate shape of opening 46 may provide a smaller opening than is formed in prior art fuel tanks, thereby reducing manufacturing time and providing a stronger finished fuel tank. The elongate shape of opening 46, which in the embodiment shown is an oval approximately the same shape as the vertically elongate outer shape of plate 14, allows second ends 26 and 28 of first and second tubes 16 and 18, which have previously been secured to plate 14, to be placed through opening 46, into an interior 52 of tank 12, prior to securing plate 14 to tank 12, thereby reducing installation time and costs of system 10.

FIGS. 5-8 are views of another embodiment of a fuel tank adapter 10. In the embodiment of FIGS. 5-8, plate 14 is secured on side wall of tank 12 at a position (shown in FIG. 7) slightly higher than the securement position of plate 14 of the first embodiment (shown in FIG. 3).

Other variations and modifications of the concepts described herein may be utilized and fall within the scope of the claims below.

I claim:

1. A method of manufacturing a fuel tank system, comprising:
   providing a fuel tank including an opening in a wall thereof and a fuel tank interior;
   providing a plate including first and second fuel tubes secured thereto, wherein said plate and said first and second tubes define a triangular shaped connection configuration there between and wherein said first tube is positioned vertically above said second tube;
   placing said first and second tubes through said opening such that said tubes are positioned in said fuel tank interior; and
   securing said plate to said tank at said opening such that said first and second tubes are secured within said interior of said tank along a single vertical axis.

2. The method of claim 1 wherein said first and second tubes are secured to one another opposite said plate such that an end region of each tube in said interior of said tank is positioned along a single horizontal axis.

3. The method of claim 1 wherein said opening is in a lower half of a sidewall of said fuel tank.

4. The method of claim 1 wherein said first and second tubes are secured to said plate along a single vertical axis and wherein said tubes are secured to each other at a position where said tubes are positioned horizontally adjacent one another.

5. A method of manufacturing a fuel draw and return system, comprising:
   providing a plate;
   securing a first fuel tube to said plate at a first end region of said first fuel tube;
   securing a second fuel tube to said plate at a first end region of said second fuel tube;
   securing said first and second fuel tubes to said plate and to one another in a central region of each of said first and second fuel tubes to define a triangular shaped connection configuration; and
   securing said first end region of said first fuel tube on said plate at a position vertically above a position where said first end region of said second tube is secured on said plate when a horizontal axis extends through an opening of a second end of each of said first and second tubes, said second end of each of said first and second tubes positioned opposite said tubes from said plate, wherein said first and said second tubes are separate from one another in a second end region and at said opening of each of said first and second tubes.

6. The method of claim 5 wherein said method comprises securing said first tube on said plate at a position vertically above a position where said second tube is secured on said plate when said second end region and said opening of each of said first and second tubes is positioned along said horizontal axis.

7. The method of claim 5 wherein said method comprises securing said first and second tubes to said plate along a first elongate axis wherein said second end region of said first tube and said second end region of said second tube are each aligned along said horizontal elongate axis perpendicular to said first elongate axis.

8. The method of claim 7 wherein an exterior surface of said second end region of said first tube and an exterior surface of said second end region of said second tube are secured directly to one another in said central region of said first and second tubes.

9. The method of claim 5 wherein said first end region of said first tube is secured vertically above said first end region of said second tube, and said second end region of said first tube is positioned horizontally adjacent to said second end region of said second tube.

10. The method of claim 5 wherein said first end region of said first tube is secured to said plate, said first end region of said second tube is secured to said plate, said second end region of said first tube defines a said opening in said first tube, and said second end region of said second tube defines said opening in said second tube that opens in a direction opposite said opening in said first tube.

11. A method of manufacturing a fuel tank system, comprising:
    providing a fuel tank including an opening and an interior;
    securing a plate over said opening;
    securing a first fuel tube to said plate such that said first fuel tube extends into said tank interior;
    securing a second fuel tube to said plate such that said second fuel tube extends into said tank interior;
    securing said first and second fuel tubes to one another and to said plate to define a triangular shaped space between said tubes and said plate; and
    securing said first tube on said plate at a position vertically above a position where said second tube is secured on said plate when a horizontal axis extends through an end region and an end opening of each of said first and second tubes such that said end region of each of said first and second tubes on said horizontal axis are positioned separate from one another.

12. The method of claim 11 wherein a plate end of said first tube is secured to said plate, a plate end of said second tube is secured to said plate, and a central region of said first tube is secured to a central region of said second tube to define said triangular shaped space between said tubes and said plate.

13. The method of claim 11 wherein said plate defines a first side of said triangular shaped space, said first tube defines a second side of said triangular shaped space, and said second tube defines a third side of said triangular shaped space.

14. The method of claim 11 wherein said fuel tank opening defines a vertically positioned opening in a lower half region of a side wall of said tank.

15. The method of claim 11 wherein said end region of said first tube defines said end opening of said first tube, and said end region of said second tube defines said end opening of said second tube that opens in a direction opposite said end opening of said first tube.

16. The method of claim 11 wherein said plate defines a perimeter distance greater than a perimeter distance of said opening.

* * * * *